(12) United States Patent
Castaneda-Lopez et al.

(10) Patent No.: US 11,340,185 B2
(45) Date of Patent: May 24, 2022

(54) REFLECTOMETRY DEVICES AND METHODS FOR DETECTING PIPE DEFECTS

(71) Applicant: THE TEXAS A&M UNIVERSITY SYSTEM, College Station, TX (US)

(72) Inventors: Homero Castaneda-Lopez, College Station, TX (US); Tristan Petit de Servins d'Hericourt, Strasbourg (FR)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 59 days.

(21) Appl. No.: 16/499,184

(22) PCT Filed: Apr. 4, 2018

(86) PCT No.: PCT/US2018/026526
§ 371 (c)(1),
(2) Date: Sep. 27, 2019

(87) PCT Pub. No.: WO2018/187730
PCT Pub. Date: Oct. 11, 2018

(65) Prior Publication Data
US 2020/0110050 A1    Apr. 9, 2020

Related U.S. Application Data

(60) Provisional application No. 62/483,183, filed on Apr. 7, 2017.

(51) Int. Cl.
*G01N 3/18*      (2006.01)
*G01N 27/20*     (2006.01)
(Continued)

(52) U.S. Cl.
CPC ............ *G01N 27/028* (2013.01); *G01M 3/18* (2013.01)

(58) Field of Classification Search
CPC .... G01N 27/028; G01N 17/006; G01N 27/20; G01M 3/18
See application file for complete search history.

(56) References Cited

U.S. PATENT DOCUMENTS

| | | | | |
|---|---|---|---|---|
| 3,497,446 A | * | 2/1970 | Behrens | ................... C25B 9/65 204/242 |
| 4,970,467 A | | 11/1990 | Burnett | |

(Continued)

FOREIGN PATENT DOCUMENTS

| | | |
|---|---|---|
| EP | 0 399 583 A2 | 11/1990 |
| EP | 0 560 443 A1 | 9/1993 |

(Continued)

OTHER PUBLICATIONS

Extended European Search Report, dated Jan. 14, 2021, issued in corresponding European Application No. 18781076.7, filed Apr. 4, 2018, 11 pages.

(Continued)

*Primary Examiner* — Alvaro E Fortich
*Assistant Examiner* — Zannatul Ferdous
(74) *Attorney, Agent, or Firm* — Christensen O'Connor Johnson Kindness PLLC

(57) ABSTRACT

Systems and methods for detecting defects in pipelines are disclosed. In one embodiment, a method for detecting defects in pipelines includes: generating an electrical signal in a first pipeline by a signal generator electrically connected with the first pipeline and a second pipeline. A reflected signal is acquired by data acquisition equipment electrically connected with the first pipeline and the second pipeline. The reflected signal at least partially reflects from a defect in the first pipeline or the second pipeline. The method also includes analyzing the reflected signal to determine at least one of a location of the defect and a severity of the defect.

(Continued)

In some embodiments, the first pipeline and a second pipeline are connected with a shunt cable.

19 Claims, 17 Drawing Sheets

(51) Int. Cl.
  *G01N 27/02* (2006.01)
  *G01M 3/18* (2006.01)

(56) References Cited

U.S. PATENT DOCUMENTS

| | | | |
|---|---|---|---|
| 5,406,025 A * | 4/1995 | Carlstedt | H01L 24/72 174/17.08 |
| 5,821,747 A * | 10/1998 | Atherton | G01N 27/902 324/220 |
| 5,907,122 A * | 5/1999 | Nakamura | H02B 13/0352 174/17 GF |
| 6,194,902 B1 * | 2/2001 | Kuo | G01N 17/00 324/535 |
| 2004/0100273 A1 | 5/2004 | Liney et al. | |
| 2005/0007121 A1 * | 1/2005 | Burnett | G01N 27/20 324/533 |
| 2007/0261495 A1 | 11/2007 | Van Der Ent et al. | |
| 2010/0301875 A1 * | 12/2010 | Roff | G01R 27/30 324/629 |
| 2011/0041612 A1 | 2/2011 | Paige | |
| 2014/0069542 A1 * | 3/2014 | Graham | F16L 55/07 138/104 |
| 2016/0160629 A1 * | 6/2016 | Donderici | E21B 47/00 324/238 |
| 2016/0168975 A1 * | 6/2016 | Donderici | G01B 7/10 324/238 |
| 2019/0064096 A1 * | 2/2019 | Sharma | G01N 17/006 |
| 2019/0162870 A1 * | 5/2019 | San Martin | G01V 3/26 |
| 2019/0339230 A1 * | 11/2019 | Khalaj Amineh | G01V 3/28 |

FOREIGN PATENT DOCUMENTS

| | | |
|---|---|---|
| JP | 1994074932 | 3/1993 |
| JP | 2012037537 A | 2/2012 |
| WO | 2011/027154 A1 | 3/2011 |
| WO | 2014050378 A1 | 4/2014 |
| WO | 2017/011871 A1 | 1/2017 |

OTHER PUBLICATIONS

Search Report and Written Opinion, dated Jun. 22, 2018, issued in priority International Patent Cooperation Treaty application PCT/US2018/026526, filed Apr. 6, 2018, 9 pages.

Japan Patent Office, Notice of Refusal, Japanese Patent Application No. 2019-555143, dated Apr. 5, 2022, 6 pages.

* cited by examiner

REFLECTOMETRY DEVICES AND METHODS FOR DETECTING PIPE DEFECTS

CROSS-REFERENCE TO RELATED APPLICATION

This application is a national phase application under Sec. 371 of International Application No. PCT/US2018/026526, filed Apr. 4, 2018, which claims priority to U.S. Provisional Application No. 62/483,183, filed Apr. 7, 2017, the contents of which are incorporated herein by reference.

FIELD OF THE INVENTION

The inventive technology relates generally to inspections of metal pipes. In particular, the inventive technology relates to detecting coating defects, detachment, delamination, corrosion or other defects on pipelines using reflectometry.

BACKGROUND

Metal pipelines may over time develop defects. Some examples of such defects are deterioration of pipe coating, detachment or delamination of pipe coating, and corrosion of the pipe or its coating. The buried pipelines are especially prone to these defects. To inspect and/or repair the pipe, pipe defects must be located, preferably without having to expose the pipeline by removing the soil around it.

Some conventional technologies for locating the pipe defects rely on generating acoustic signal (e.g., the ultrasound) into the material of pipe, followed by measuring the reflected acoustic signal. Since the acoustic signal reflects off the defects in the pipe, the location of the defect can be determined based on, for example, a return-trip time of the acoustic signal. However, the acoustic signal attenuates relatively quickly, therefore limiting the sensitivity of this conventional technology. Furthermore, it is generally difficult to predict the reflections of the acoustic signal. For example, the angle of the reflection may be strongly influenced by the shape of a particular defect, making it difficult to pinpoint the location of the defect.

Some conventional technologies survey the pipeline by applying either direct or alternating current to the segments of the pipe. These conventional technologies are known as a direct current voltage gradient (DCVG) survey and an alternating current voltage gradient (ACVG) survey. During the inspection, voltage is applied to a segment of the pipe using, for example, metal poles that protrude through the soil and contact the surface of the pipe. Voltage drop along the segment of the pipe generally correlates to the state of the pipe. For example, the defects along the pipeline will cause larger voltage drop, all other conditions being equal. After one segment of pipe is inspected, the crew moves to the next segment, and so on, until the entire pipeline is inspected. As a result, the DCVG/ACVG surveys are labor intensive and require long time to complete. Furthermore, the results of the DCVG/ACVG surveys are strongly dependent on soil resistivity, because part of the electrical current will travel through the soil around the pipe. Because the concentration of salts or moisture in the soil may significantly change the soil resistivity, the measurement results are less reliable and/or difficult to interpret. Accordingly, there remains a need for methods and systems for detecting defect location and severity.

DESCRIPTION OF THE DRAWINGS

The foregoing aspects and many of the attendant advantages of the inventive technology will become more readily appreciated as the same become better understood by reference to the following detailed description, when taken in conjunction with the accompanying drawings, wherein.

SUMMARY

Figure 1:
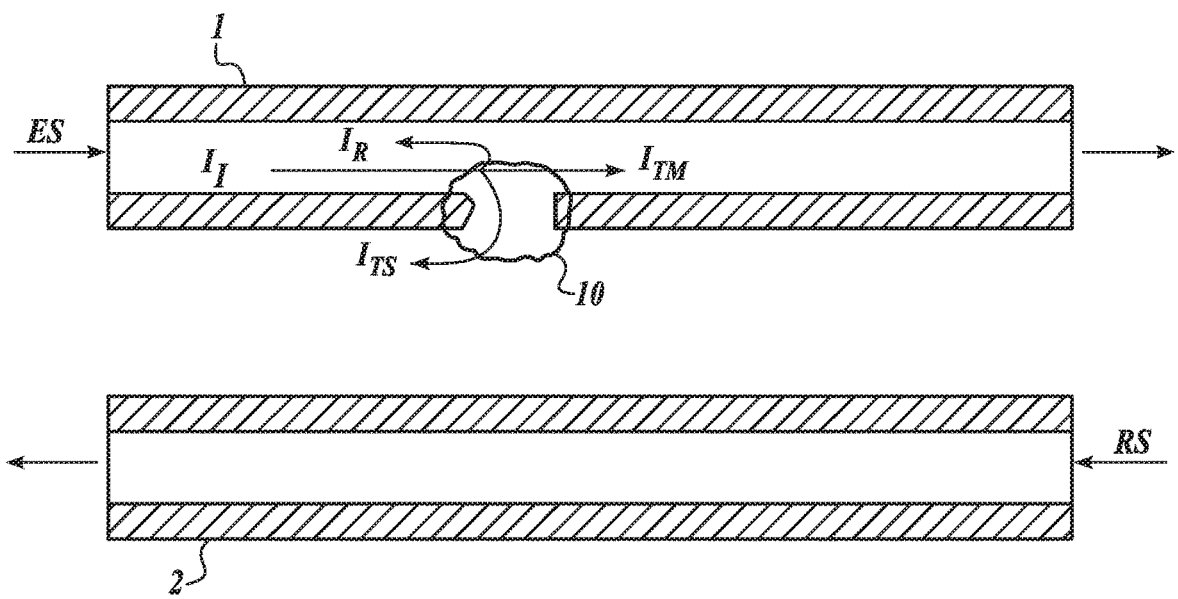
FIG. 1 is a schematic view of signal propagation in accordance with an embodiment of the presently disclosed technology.

This summary is provided to introduce a selection of concepts in a simplified form that are further described below in the Detailed Description. This summary is not intended to identify key features of the claimed subject matter.

The inventive technology is directed to finding the location and estimating the severity of pipe defects. In some embodiments, a test electrical signal is generated by a signal generator, and is applied to the pipeline under inspection. The signal propagates through the pipeline and interacts with the defects in the pipeline. The defects in the pipeline cause a change in electrical impedance of the pipeline. Therefore, part of the test signal (e.g., voltage or current signal) reflects off the defect back toward data acquisition equipment (e.g., oscilloscope, analog-to-digital (A/D) converter, spectrum analyzer, etc.) which acquires the reflected signal. The reflected signal can be analyzed to estimate the location and severity of the defect. For example, in some embodiments, a time delay (e.g., a return-trip delay) between the emitted and received signal corresponds to a distance to the defect, and the amplitude of the received signal corresponds the severity of the defect.

In some embodiments, an adjacent pipeline may be used as a return path for the signal. Such return path has stable electromagnetic properties, unlike in the case of the return path for the signal being the soil having variable electromagnetic properties based on different moisture and/or salt content in the soil. The two pipelines may be connected by, for example, shunt cables. Furthermore, since the two pipelines are surrounded by the soil having similar electromagnetic properties, the electromagnetic noise caused by the leakage of signal into the soil may be calibrated and canceled out. The environment surrounding the surveyed pipeline(s) may be referred to as the "corrosive-electrolyte environment." Typically the corrosive-electrolyte environment is soil, but it will be appreciated that many other substances may be present around pipes in a pipeline, for example, water, concrete, gas, and their combinations.

In some embodiments, the pipes can be accessed inside the manholes of a given length. The measurements may be performed by sending the signals to the pipeline at the two ends of the manhole. Since the entry points of the signals are offset by the length of the manhole, the return-trip delay time of the reflected signals will be different in proportion with the length of the manhole and the speed of signal. In some embodiments, the two measurements at the two ends of the pipeline may be combined to more precisely identify the location of the defects.

In an embodiment, a method for detecting defects in pipelines includes: generating an electrical signal in a first pipeline and a second pipeline by a signal generator electrically connected with the first pipeline and the second pipeline; acquiring a reflected signal by a data acquisition equipment electrically connected with the first pipeline and the second pipeline. The reflected signal at least partially reflects from a defect in the first pipeline or the second pipeline. The method also includes analyzing the reflected signal to determine at least one of a location of the defect and a severity of the defect.

In one aspect, the first pipeline and a second pipeline are connected with a shunt cable. In another aspect, the electrical signal is a differential electrical signal, and the signal generator generates a high signal in the first pipeline and a low signal in the second pipeline.

In one aspect, the method includes adjusting a frequency of the electrical signal such that a skin depth ($\delta$) for the electrical signal corresponds to a wall thickness (e) of the pipeline. In another aspect, the method includes adjusting a frequency of the electrical signal such that an impedance of the defect (ZD) is an order of magnitude larger than an impedance of the first pipeline and the second pipeline (Z0). In another aspect, the method includes adjusting a frequency of the electrical signal such that a reflection coefficient ($\Gamma$) for the signal is bounded by:

$$\beta_\Gamma \leq \Gamma \leq \alpha_\Gamma$$

where $\beta_\Gamma$ is a lower bound ratio and $\alpha_\Gamma$ is an upper bound ratio.

In one aspect, the electrical signal is a first electrical signal that is generated at a first end of a manhole, and the reflected signal is a first reflected signal that is acquired at the first end of the manhole. Furthermore, the method includes generating a second electrical signal in the first pipeline by the signal generator electrically connected with the first pipeline at a second end of the manhole. The second end of the manhole is opposite from the first end of the manhole in a longitudinal direction along the first pipeline. The method also includes acquiring a second reflected signal by the data acquisition equipment electrically connected with the first pipeline at the second end of the manhole. The second reflected signal at least partially reflects from the defect. The method also includes analyzing the first reflected signal and the second reflected signal to determine at least one of the location of the defect and the severity of the defect.

In one aspect, the first pipeline includes the defect that is in contact with a wall of the manhole. In another aspect, the reflected signal propagates at least partially through a corrosive-electrolyte environment that surrounds the first pipeline and the second pipeline. In another aspect, the location of the defect is determined based on a return-trip delay between generating the electrical signal and receiving the reflected signal.

In one embodiment, a method for detecting defects in pipelines includes: generating a first electrical signal in a first pipeline by a signal generator electrically connected with the first pipeline and a second pipeline; and acquiring a first reflected signal by a data acquisition equipment electrically connected with the first pipeline and the second pipeline. The reflected signal at least partially reflects from a defect in the first pipeline or the second pipeline. The method also includes generating a second electrical signal in the second pipeline by the signal generator; acquiring a second reflected signal by the data acquisition equipment, wherein the reflected signal at least partially reflects from the defect; and analyzing the first reflected signal and the second reflected signal to determine at least one of a location of the defect and a severity of the defect.

In another embodiment, a method for detecting defects in pipelines includes generating a first electrical signal in a first pipeline by a signal generator electrically connected with the first pipeline and a second pipeline. The first pipeline and a second pipeline are electrically connected through a corrosive-electrolyte environment. The method further includes acquiring a first reflected signal by a data acquisition equipment electrically connected with the first pipeline and the second pipeline. The reflected signal at least partially reflects from a defect in the first pipeline or the second pipeline. The method also includes generating a second electrical signal in the second pipeline by the signal generator; and acquiring a second reflected signal by the data acquisition equipment. The reflected signal at least partially reflects from the defect. The method also includes analyzing the first reflected signal and the second reflected signal to determine at least one of a location of the defect and a severity of the defect.

In one embodiment, a system for detecting defects in pipelines includes: a signal generator electrically connected with a first pipeline and a second pipeline that is configured to generate a differential signal in the first pipeline and the second pipeline; and a data acquisition equipment electrically connected with the first pipeline and the second pipeline. The data acquisition equipment is configured to receive a reflected signal at the first pipeline. The reflected signal is reflected at least partially off a defect in the first pipeline or the second pipeline.

In one aspect, the first pipeline and a second pipeline are connected with a shunt cable. In another aspect, the shunt cable has adjustable impedance.

In one aspect, the first pipeline and the second pipeline are at least partially buried. In another aspect, the first pipeline and the second pipeline are at least partially inside a manhole. In another aspect, the signal generator is connected with the first pipeline and the second pipeline with at least one differential cable. In another aspect, the system includes a switch for connecting the signal generator with the differential cable.

In one aspect, the data acquisition equipment is connected with the first pipeline and the second pipeline with at least one differential cable. In another aspect, the data acquisition equipment is selected from a group consisting of an oscilloscope, an analog-to-digital (A/D) converter, and a spectrum analyzer.

In one aspect, a skin depth ($\delta$) of the electrical signal corresponds to a wall thickness (e) of the pipeline. In another aspect, an impedance of the defect (ZD) is an order of magnitude larger than an impedance of the first pipeline and the second pipeline (Z0).

In one aspect, the defect is in contact with a wall of a manhole. In another aspect, the defect is one of a detachment, a delamination, or a corrosion area.

DETAILED DESCRIPTION

While illustrative embodiments have been illustrated and described, it will be appreciated that various changes can be made therein without departing from the spirit and scope of the inventive technology.

FIG. 1 is a schematic view of signal propagation in accordance with an embodiment of the presently disclosed technology. In operation, emitted signal ES propagates along pipeline 1. An example of such signal is $I_1$. Some examples of the pipelines are metal pipes for transporting oil, gas, water, chemicals, pressurized air, etc. These pipelines may be partially or completely buried into the soil or submerged in a body of water.

When encountering a defect 10 (e.g., deterioration of the pipe coating, detachment or delamination of the pipe coating, corrosion of pipe or coating, etc.), signal $I_1$ partially reflects as $I_R$, and partially transmits as $I_{TM}$ through the pipeline 1 and as $I_{TS}$ into the surrounding soil. The reflected signal $I_R$ returns toward the source, and the transmitted signal $I_{TM}$ continues to travel along pipeline 1 to return as a returned signal RS through a pipeline 2. The pipelines 1 and 2 may be connected with a shunt cable (not shown) to close the path for the signals.

Figure 2:
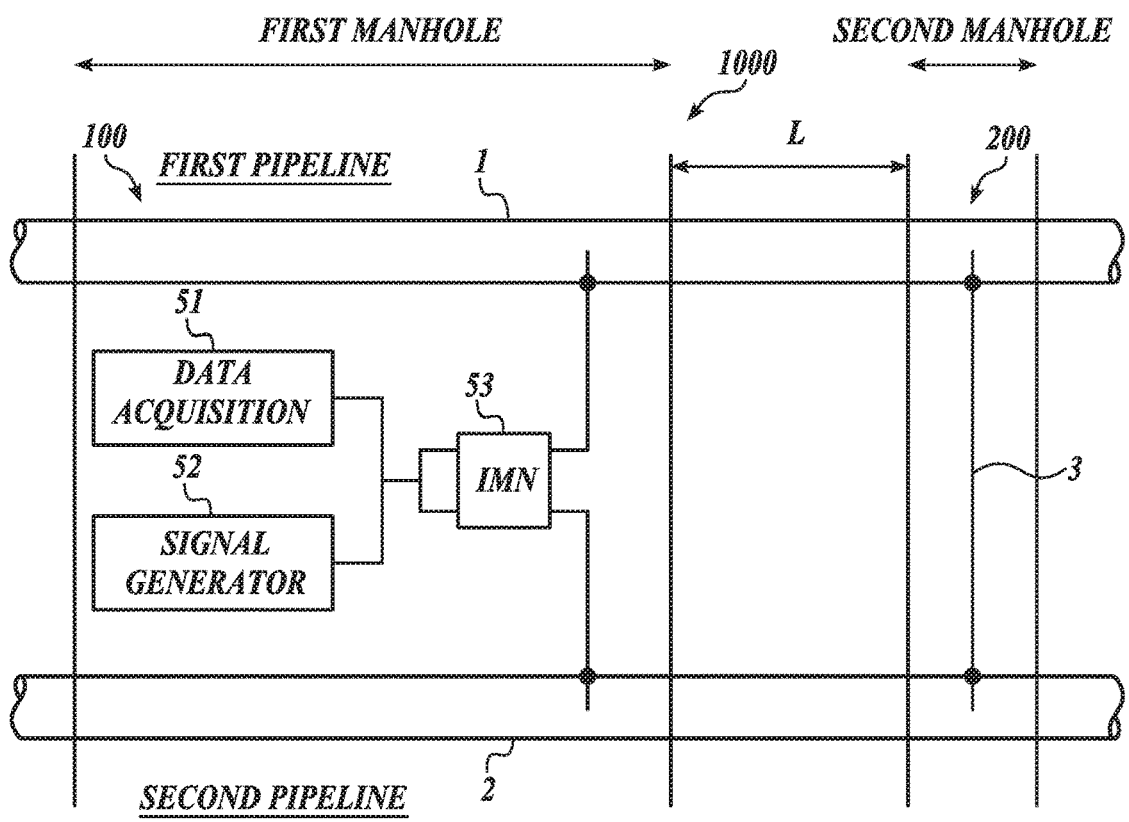
FIGS. 2-3A are schematic views of defect detection in accordance with embodiments of the presently disclosed technology.
Figure 3:
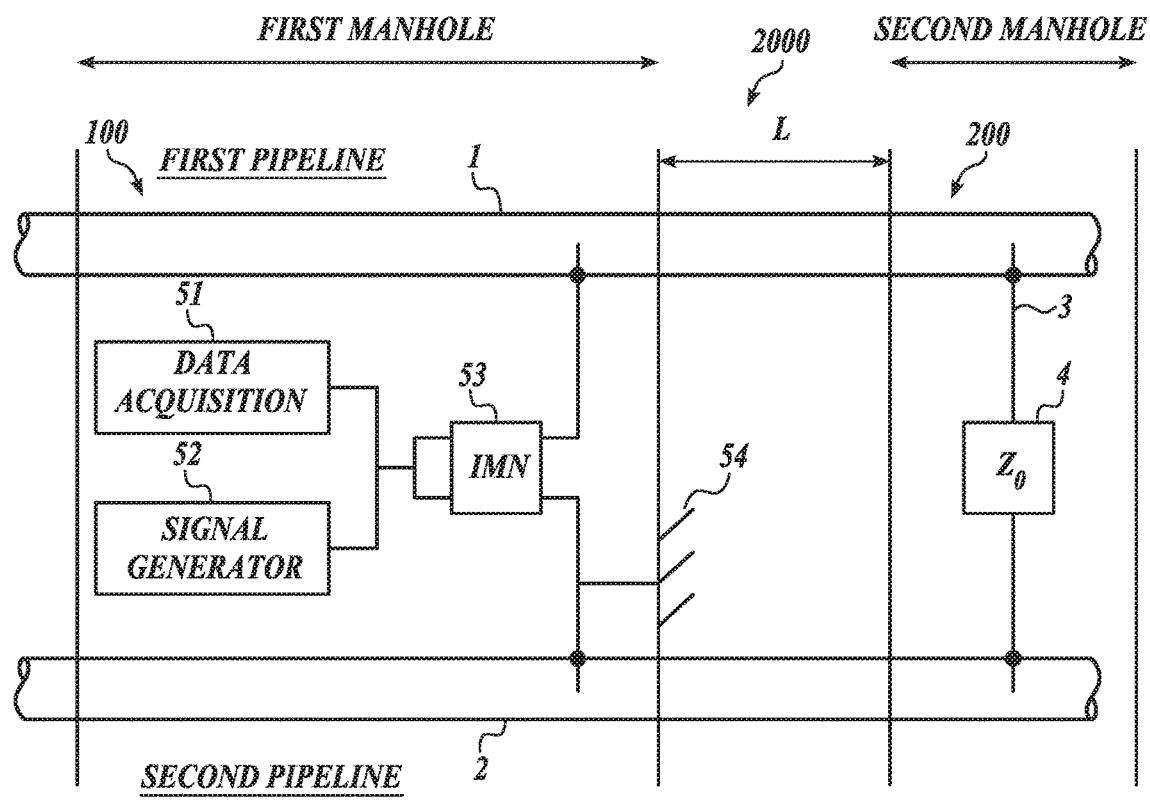
Figure 3A:
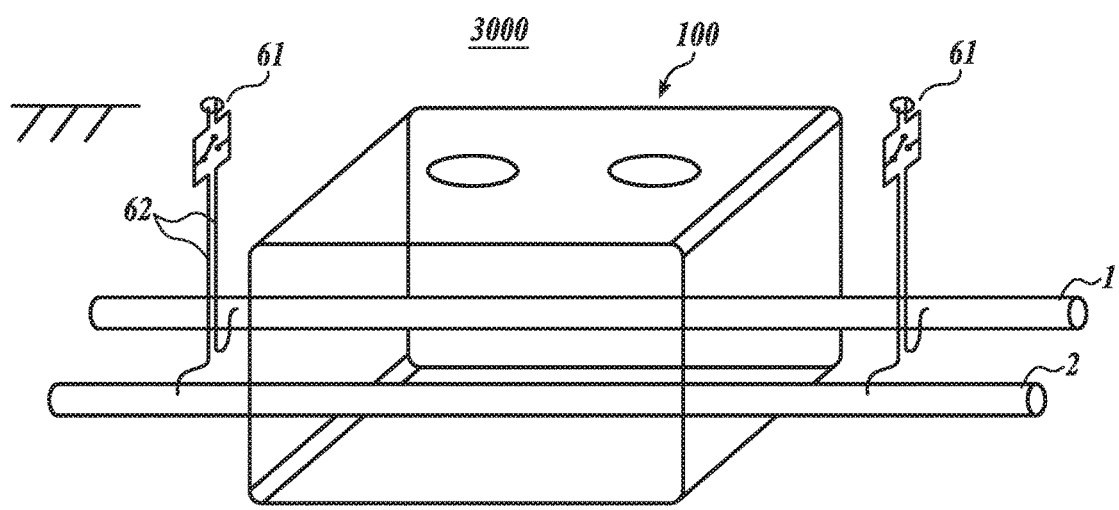

FIGS. 2-3A are schematic views of defect detection in accordance with embodiments of the presently disclosed technology. In these Figures, the pipelines 1 and 2 extend left to right. In some embodiments, the pipeline 1 may be under inspection, while the generally parallel pipeline 2 provides the return path for the signal. The pipelines 1 and 2 may be electrically connected with a shunt cable 3. In some embodiments, manholes 100 and 200 allow access to the pipelines 1 and 2. In the illustrated embodiments, the manholes 100 and 200 are separated by a distance L.

In some embodiments, a signal generator 52 (also referred to as a "waveform generator"), data acquisition equipment 51 (e.g., oscilloscope, analog-to-digital (A/D) converter, spectrum analyzer, etc.), and impedance matching network (IMN) 53 are located in the manhole 100. The signal generator 52, data acquisition equipment 51 and the IMN 53 are collectively referred to as "signal generating and acquisition equipment." In different embodiments, the signal generating and acquisition equipment may be in the manhole 200 or above the ground. In operation, the signal generator 52 generates a signal that propagates along pipeline 1. The returned signal may be acquired by the data acquisition equipment 51. In some embodiments, the IMN 53 is connected to the pipelines 1 and 2 to match the impedances between the equipment and the pipelines. In some embodiments, the system operates without the IMN 53. For example, the signal generator 52 may be connected to the pipelines 1 and 2 to generate a differential signal in the pipelines, and the data acquisition equipment 51 may be connected to the pipelines 1 and 2 to acquire the reflected signal.

Analysis of the reflected signal is sometimes referred-to as reflectrometry. When the signals are analyzed in the time domain, the reflectrometry is referred to as the time-domain reflectrometry, and when the signals are analyzed in the frequency domain, the reflectrometry is referred to as the frequency-domain reflectrometry.

In some embodiments, since the pipes are relatively closely packed, changes of properties in the soil (the corrosive-electrolyte environment) along the pipeline line affect both pipelines in the same way. Therefore, for every pair of longitudinal pipelines, the effects of the changing properties of the soil may be minimized or at least reduced by switching the signal-carrying and signal-return roles of the pipelines, and then comparing the profiles. Furthermore, since the reflections occur on the signal-carrying pipeline, the inventive technology can also determine which pipeline is affected by the defects along the pipeline.

In some embodiments, the signals propagate from the first pipeline 1 to the second pipeline 2 through the shunt cable 3. In some embodiments, the signal generator 52 may produce an electrical signal that travels through the first pipeline 1, from the first pipeline to the second pipeline through the corrosive-electrolyte environment that surrounds the pipelines, and back to the data acquisition equipment 51 through the second pipeline 2 (transmitted signal) or the first pipeline 1 (reflected signal). The acquired signals may be analyzed to determine the location and/or severity of the defects.

In some embodiments, the signal generator 52 may produce electrical signals in the first pipeline 1 for some scans, and the acquisition equipment 51 may acquire the reflected and/or transmitted signal. Next, a reverse operation is performed for one or more second scans, where the reflected and/or transmitted electrical signals are acquired. The acquired signals of the first and second scans may be compared to determine the location and/or severity of the defects.

With a system 1000 of FIG. 2, signal is emitted by the signal generator 52 into the pipeline 1. The signal propagates through the pipeline 1, and the transmitted part of the signal returns to the data acquisition equipment 51 through the shunt cable 3 (e.g., a copper or aluminum bar) and the pipeline 2.

With a system 2000 of FIG. 3, signal is also emitted by the signal generator 52 into the pipeline 1. The system 2000 includes a soil electrode 54 (e.g., grounding to the soil) and a customable characteristic load 4 (e.g., shunt cable with adjustable impedance) having an impedance $Z_0$. In some embodiments, the impedance $Z_0$ may be adjustable (e.g., using variable capacitance or inductance).

With a system 3000 of FIG. 3A, signals reach the pipelines 1 and 2 through a differential switch 61. The switch may be connected with the signal generating and acquisition equipment by a differential cable, for example, a balanced, differential BNC cable 62. The differential cable 62 may deliver a differential signal into the pipelines 1 and 2 by, for example, driving a high signal into the pipeline 1 and a low signal into the pipeline 2.

Figure 4:
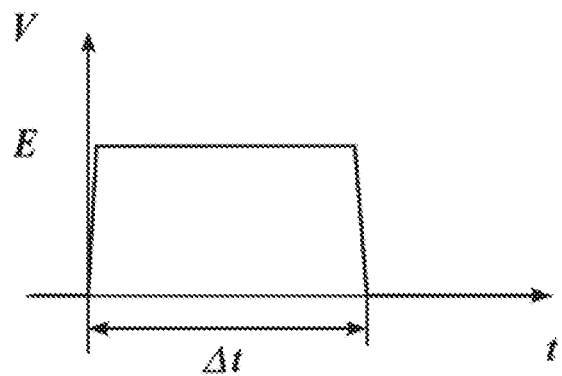
FIGS. 4 and 5 are graphs of test signals in accordance with embodiments of the presently disclosed technology.
Figure 5:
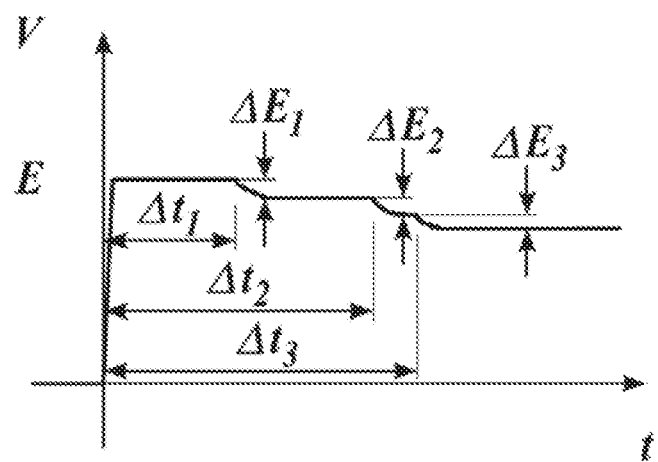

FIGS. 4 and 5 are graphs of test signals in accordance with embodiments of the presently disclosed technology. In both graphs, the horizontal axes show time, and the vertical axes show amplitude E in volts. In different embodiments, the amplitude of the signal may be expressed as, for example, electrical current in amperes. The test signals may be produced by, for example, the signal generator 53.

FIG. 4 shows a step signal having a relatively constant voltage E for a duration of time Δt. FIG. 5 shows a series of step signals. For example, the signal has a relatively constant voltage E for a duration of time $\Delta t_1$, followed by voltage $E-\Delta E_1$ for a duration of time $\Delta t_2-\Delta t_1$, followed by voltage $E-\Delta E_1-\Delta E_2$ for a duration of time $\Delta t_3-\Delta t_2-\Delta t_1$, etc. It can be shown that a reflectivity Γ of the step signal in FIG. 4 corresponds to:

$$\Gamma = \frac{Z_L - Z_O}{Z_L + Z_O}$$

where $Z_L$ is impedance of the load and $Z_O$ is a characteristic impedance. When:

$$Z_L=0 \; \Gamma=1$$

the signal faces a short circuit. Generally, signal propagation velocity v can be expressed as:

$$v = \frac{2L}{\Delta t}$$

where 2L is the length that the signal traverses (e.g., one L for the tested pipeline, plus one L for the pipeline of the return path), and Δt is time required for the return-trip of the signal. In some embodiments, the signal shown in FIG. 4 is used with the system shown in FIG. 2.

For the signal shown in FIG. 5, the reflectivity may be expressed as:

$$\Gamma_i = \frac{\Delta E_i}{E - \sum_{j=0}^{i-1} \Delta E_j}$$

$$= \frac{Z_O}{Z_O + 2Z_{Di}}$$

where $Z_{Di}$ corresponds to the impedances of the defects along the pipeline. It can be shown that the bulk dielectric constant of the soil surrounding the two pipes is:

$$\varepsilon = \left(\frac{c}{v}\right)^2 = \left(\frac{ct}{2L}\right)^2$$

In practice, $lc=\mu\varepsilon$ and $\mu=\mu_o$ for virtually every medium except iron compounds, where μ is permeability and ε is permittivity (or dielectric constant). Furthermore, because for most practical applications the dielectric constant of the soil is dominated by $\varepsilon_{water}$, the resistivity of the soil may be determined from the water content of the soil. For example, the signal shown in FIG. 5 may be used with the system shown in FIG. 3 to determine water content and resistivity of the soil.

Figure 6:
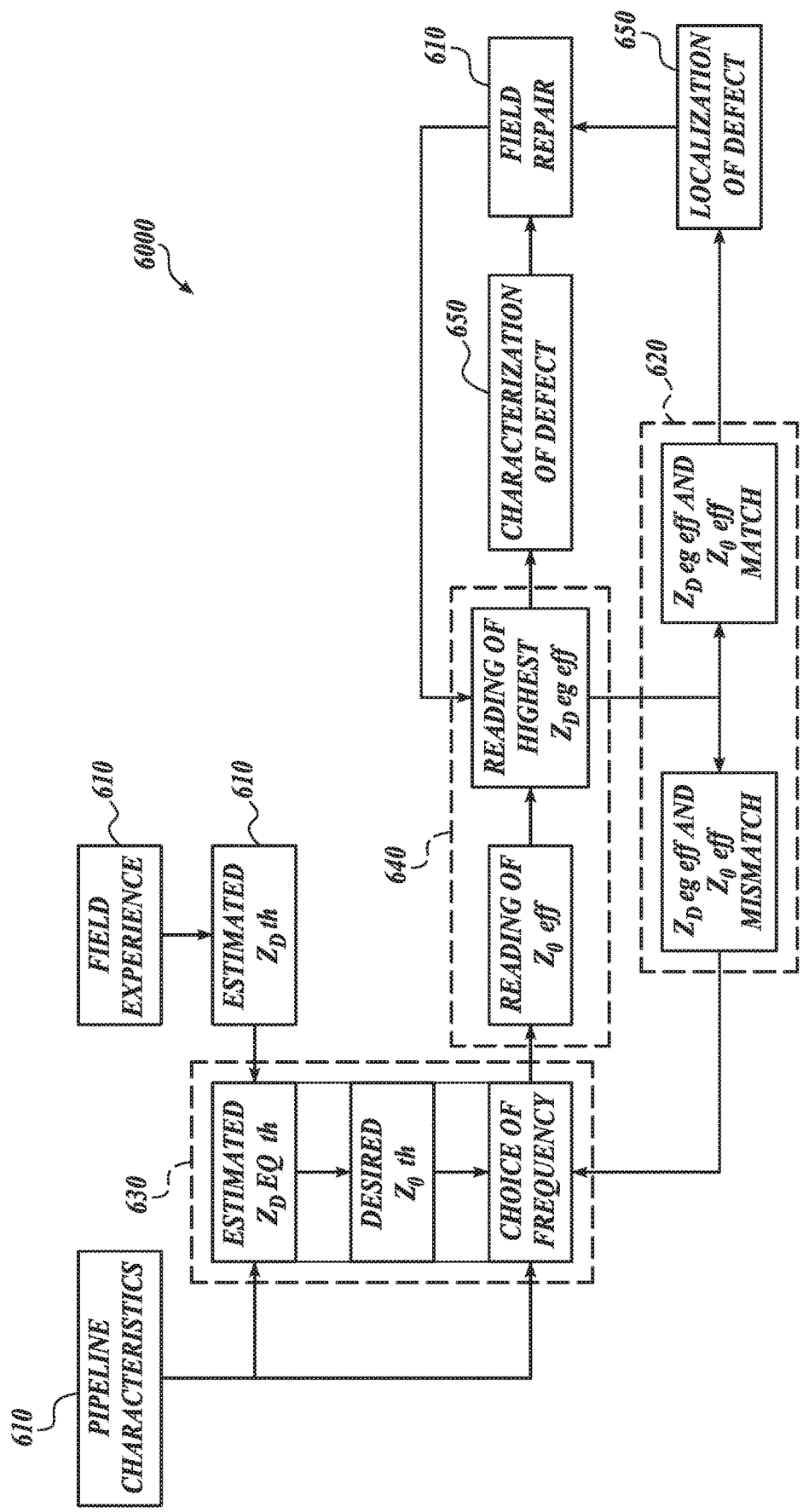
FIG. 6 is a flow diagram of a method for defect detection in accordance with an embodiment of the presently disclosed technology.

FIG. 6 is a flow diagram 6000 of a method for defect detection in accordance with an embodiment of the presently disclosed technology. In the illustrated method, blocks 610 correspond to the inputs (e.g., data inputs or activities). Some examples of such inputs are pipeline characteristics, field experience, field repairs, or estimates about the impedances $Z_0$. Blocks 620 represent user choices for, for example, declaring whether some value of $Z_0$ is a match or a mismatch for the defect impedance $Z_D$. Blocks 630 represent computation, for example estimates for $Z_D$, desired $Z_0$th, or a choice of frequency.

Blocks 640 represent field testing results (e.g., measurement results). Some examples of field testing results are the readings of effective impedances $Z_{0\;eff}$ and equivalent effective impedances $Z_{0\;eq\;eff}$. Blocks 650 represent the results obtained by the method, for example, the location of the defect and a characterization of the defect. Some examples of the characterization of the defect are severity of the defect and type of the defect (corrosion, delamination, etc.).

Transmission Line Models

Figure 7:
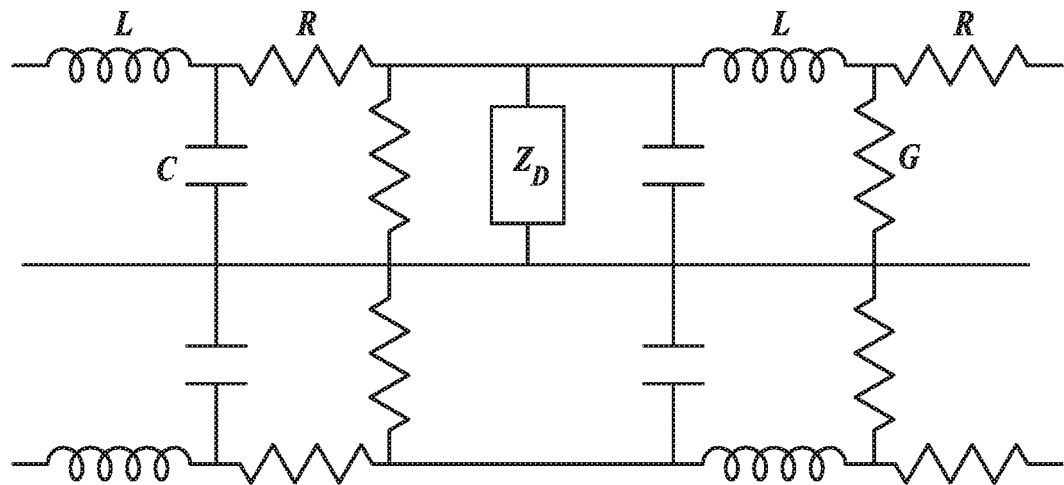
FIGS. 7 and 8 are schematic diagrams of transmission line models in accordance with embodiments of the presently disclosed technology.
Figure 8:
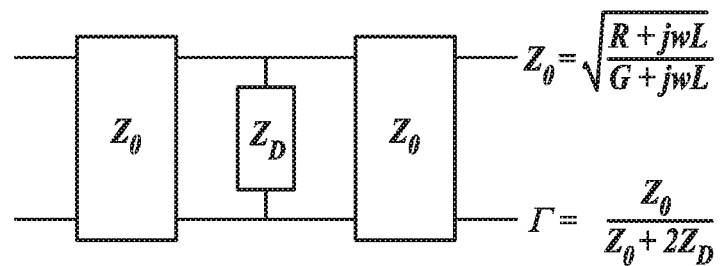

FIGS. 7 and 8 are schematic diagrams of transmission line models in accordance with embodiments of the presently disclosed technology. These transmission line models represent the behavior of signal as it propagates along the pipes. FIG. 7 shows a transmission line model that includes distributed elements: C (capacitance), L (inductance), R (resistance) and G (conductance). The illustrated transmission line model also includes $Z_D$—the impedance of the defect or defect impedance.

FIG. 8 shows a compacted transmission line model that includes characteristic impedance $Z_0$ and defect impedance $Z_D$. The reflectivity F can be expressed as:

$$\Gamma = \frac{Z_O}{Z_O + 2Z_D}$$

The characteristic impedance $Z_0$ corresponds to:

$$Z_O = \sqrt{\frac{R + jwL}{G + jCw}}$$

where w is the angular frequency (2πf).

Pipeline Defects

Figure 9:
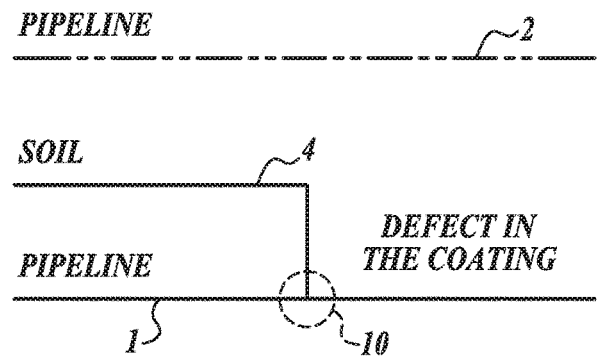
FIGS. 9 and 10 are schematic diagrams of pipeline defects in accordance with embodiments of the presently disclosed technology.
Figure 10:
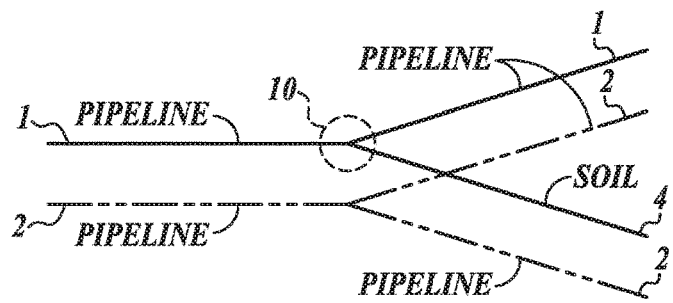

FIGS. 9 and 10 are schematic diagrams of pipeline defects in accordance with embodiments of the presently disclosed technology. The schematic diagram of FIG. 9 shows the pipeline 1 being under inspection, and the pipeline 2 being a return path for the signal. In some field situations, the defect 10 may create an electrical path to the soil. An example of such defect is delamination, but other defects may also create an electrical path for the signal to, at least partially, enter the soil.

The schematic diagram of FIG. 10 also shows the pipelines 1 and 2. In some embodiments, because of the configuration or type of the defect, the return path pipeline 2 provides return path for the signal traveling through the pipeline 1 and the soil.

Signal Propagation

Figure 11:
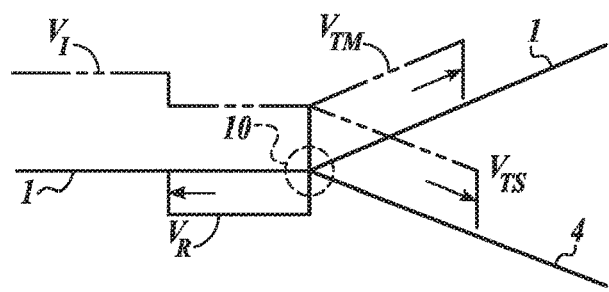
FIGS. 11 and 12 are schematic diagrams of signal propagation in accordance with embodiments of the presently disclosed technology.
Figure 12:
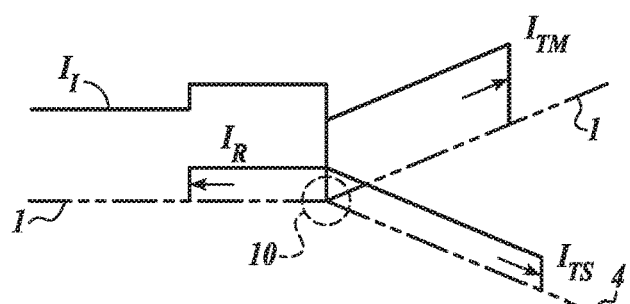

FIGS. 11 and 12 are schematic diagrams of signal propagation in accordance with embodiments of the presently disclosed technology. FIG. 11 shows the incoming signal $V_1$ that, upon arriving to the defect 10, partially reflects as a signal $V_R$ toward the source of the signal (e.g., the signal generator). The signal also continues to propagate as a transmitted signal $V_{TM}$ through the pipeline 1 and as a transmitted signal $V_{TS}$ into the surrounding soil. FIG. 12 depicts an analogous scenario where the current I represents the signal.

Impedance Matching

Figure 13:
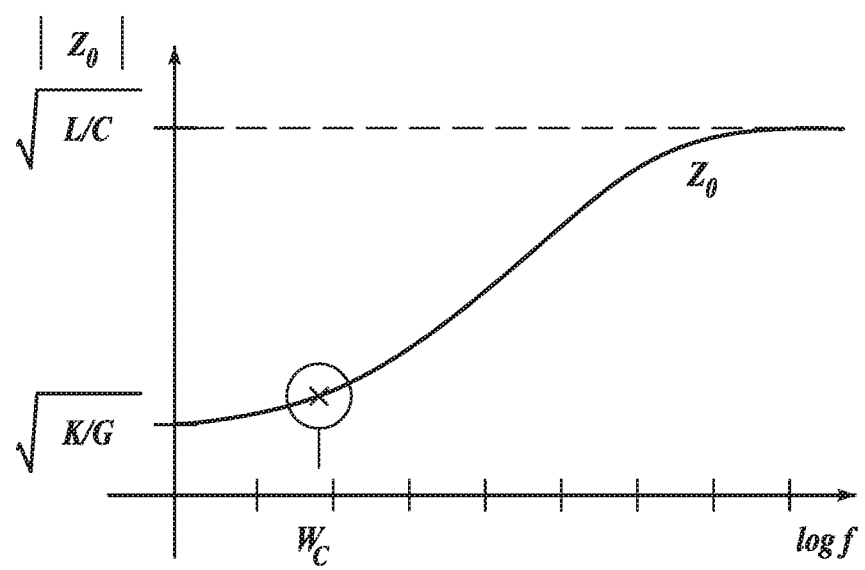
FIGS. 13 and 14 are graphs of pipeline impedance in accordance with embodiments of the presently disclosed technology.
Figure 14:
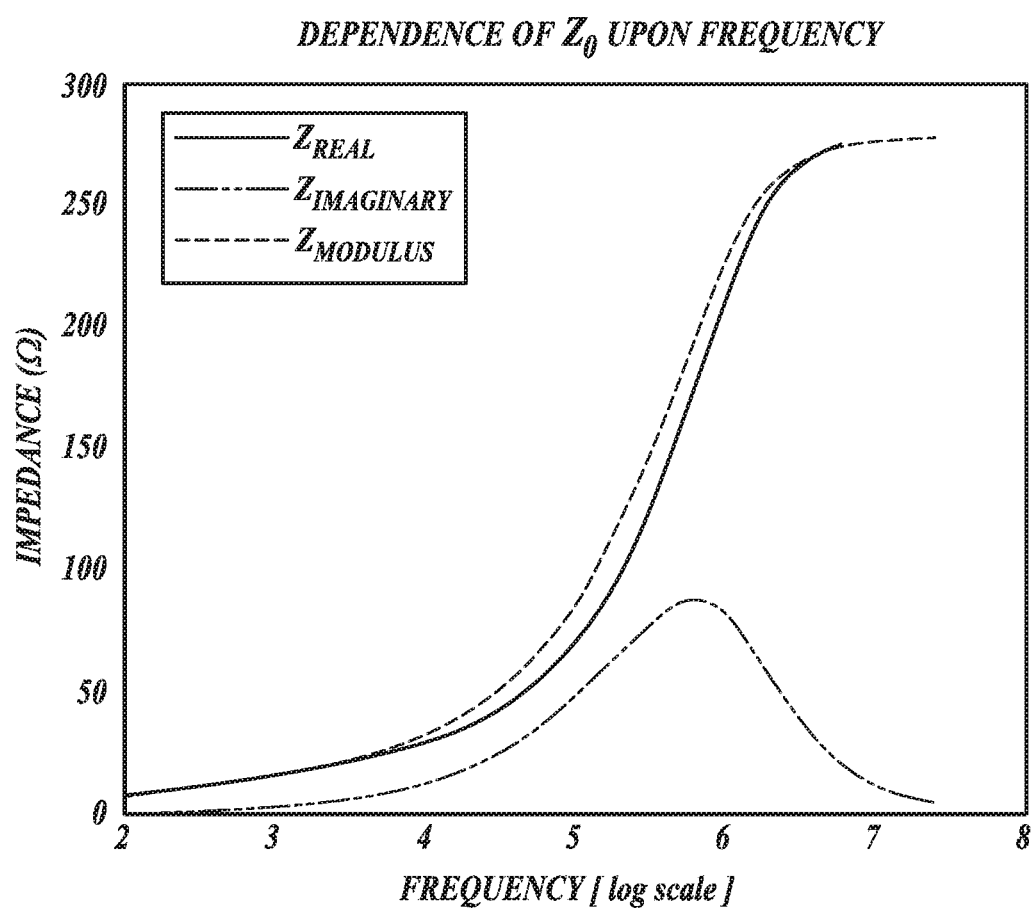

FIGS. 13 and 14 are graphs of pipeline impedance in accordance with embodiments of the presently disclosed technology. In at least some embodiments, using a second pipeline as a return waveguide for the signal eliminates problems related to the irregularities within the soil. For example, the resistance of the soil generally changes along the pipeline. When the soil is used as the return path for the signal, a complex and stochastic nature of the distribution of electrical current within the soil make it difficult to model the soil as the return branch of a classical transmission line. However, when the pipeline 2 is used as the return path, the total amount of current leaking through the defect (e.g., a coating defect) of the surveyed pipeline can be kept within a certain fraction of the current flowing through the pipeline loop, therefore making the properties of soil less important. In some embodiments, parameters α (upper bound ratio) and β (lower bound ratio) may be predefined to assure that the amount of current leaking into the soil is within preferable bounds. These parameters may be defined as:

$$\frac{\Sigma I_{TS}}{I_{TM}} \leq \alpha_I$$

$$\frac{I_R}{I_I} \geq \beta_I$$

Without being bound to theory, it is believed that the accuracy of defect location is improved by bounding the value of $\alpha_1$, and that the accuracy of characterization of defect (e.g., characterization of type and/or magnitude of defect) is improved by bounding the value of $\beta 1$. As a result, an analogous range for the reflection coefficient can be defined as:

$$\beta_\Gamma \leq \Gamma \leq \alpha_\Gamma$$

or $$\beta_\Gamma \leq \frac{Z_O}{Z_O + 2Z_D} \leq \alpha_\Gamma$$

As an approximation, the above range can be simplified to:

$$\beta_\Gamma \leq \frac{Z_O}{2Z_D} \leq \alpha_\Gamma$$

In some embodiments, the values can be set to:

$$\alpha_I = 5\% \quad \alpha_\Gamma \approx \frac{\alpha_I}{N}$$

where N represents the number of defects on the pipeline. As a result:

$$\alpha_\Gamma \ll 1$$

$$\Gamma \ll 1$$

$$Z_D \gg Z_O$$

In some embodiments, the above inequalities may be interpreted as corresponding to at least an order of magnitude difference. For example, $\alpha_\Gamma \ll 1$ may be interpreted as $\alpha_\Gamma$ being less than 0.1. In other embodiments, the compared values may be at least two orders of magnitude different, for example $\Gamma \ll 1$ signifying that $\Gamma$ is less than 0.01. In different embodiments, other comparisons among the values are possible.

Role of Frequency in Impedance Matching

In some embodiments, the frequency of the signal is used as a control parameter of the characteristic impedance $Z_o$ and, consequently, the reflection coefficient $\Gamma$. Such control is possible, at least in part, because of the skin effect occurring in the metal (e.g., steel) of the pipeline. In some embodiments, the values of $Z_O$ and $Z_D$ can be combined with the choice of signal frequency f through $\beta_\Gamma$ and $\alpha_\Gamma$, as described below.

We know that:

$$Z_O = \sqrt{\frac{R + jwL}{G + jCw}}$$

It can be shown that, because of the skin effect:

$$R(w) = K \cdot \sqrt{w}$$

where K is a constant and R is a resistance. Therefore:

$$Z_O = \sqrt{\frac{K \cdot \sqrt{w} + jLw}{G + jCw}}$$

The expression for the skin depth provides:

$$\delta = \sqrt{\frac{2\rho}{w\mu}} \sqrt{\sqrt{1 + (\rho w \varepsilon)^2} + \rho w \varepsilon}$$

where
  ρ=resistivity of the conductor
  ω=angular frequency of current=2π×frequency
  $\mu = \mu_r \mu_0$
  $\mu_r$=relative magnetic permeability of the conductor
  $\mu_0$=the permeability of free space
  $\epsilon = \epsilon_r \epsilon_0$
  $\epsilon_r$=relative permittivity of the material
  $\epsilon_0$=the permittivity of free space
If w≪ρw, then:

$$\delta = \sqrt{\frac{2\rho}{w\mu}}$$

However, since:

$$R = \frac{\rho}{2\pi r \delta}$$

then $$R = \sqrt{\frac{\rho w \mu}{2\sqrt{2}\,\pi r}}$$

FIG. 13 is a graph of the characteristic impedance $Z_O$ obtained using the above expression for $Z_O$ and $\delta$. The horizontal axis shows the logarithm of frequency f. The vertical axis shows the absolute value of the characteristic impedance $Z_O$. In some embodiments, it is advantageous that the skin depth ($\delta$) generally corresponds to the thickness of the pipe wall (e), because the available material of the pipe becomes fully utilized for the propagation of the signal, therefore limiting the unwanted attenuation of the signal. The value $w_c$ is the angular frequency for which the skin depth corresponds to the thickness of the pipe wall. In some embodiments, the skin depth may correspond to the thickness of the pipe wall within, for example, +/−5% or +/−10% variation.

FIG. 14 is a graph of pipeline impedance in accordance with embodiments of the presently disclosed technology. The horizontal axis shows logarithm of frequency. The vertical axis shows real part, imaginary part and absolute value of the characteristic impedance $Z_O$. In some embodiment, a range of $|Z_O|$ corresponds to the defects ranging from large delaminations (also referred to as "large holidays") to small delaminations in the pipeline.

A sample case was simulated with the following parameters:
diameter of the pipe—3 inches;
thickness of the pipe—5 mm;
material of the pipe—carbon steel;
distance between the pipelines—1 m apart; and
pipeline coating—20 mils of coal tar.
The physical properties are as follow:
$K=1.33\ \Omega\cdot r^{-1/2}\cdot m^{-1}\cdot 10^{-4}$
$L=1.38\cdot 10^{-6}\ H\cdot m^{-1}$
$G=2.0\cdot 10^{-5}\ \Omega^{-1}\cdot m^{-1}$
$C=1.8\cdot 10^{-112}\ F\cdot m^{-1}$
$R=K\cdot \sqrt{w}$
The values of $Z_O$ were calculated using the above-listed parameters and material properties. The results are shown in the graph of FIG. 14 and in Table 1 below.

TABLE 1

Characteristic impedance $Z_0$ as a function of frequency

| FREQ. | LOG FREQ. | $Z_{REAL}$ | $Z_{IMAGINARY}$ | $Z_{MODULUS}$ |
|---|---|---|---|---|
| 100 | 2.00 | 8.17 | 0.42 | 8.18 |
| 150 | 2.18 | 9.04 | 0.57 | 9.06 |
| 250 | 2.40 | 10.29 | 0.84 | 10.32 |
| 500 | 2.70 | 10.28 | 1.40 | 12.36 |
| 750 | 2.88 | 13.63 | 1.89 | 13.76 |
| 1000 | 3.00 | 14.69 | 2.34 | 14.88 |
| 1500 | 3.18 | 16.36 | 3.15 | 16.66 |
| 2500 | 3.40 | 18.81 | 4.57 | 19.35 |
| 5000 | 3.70 | 22.97 | 7.46 | 24.15 |
| 7500 | 3.88 | 26.02 | 9.87 | 27.83 |
| 10000 | 4.00 | 28.54 | 11.98 | 30.96 |
| 15000 | 4.18 | 32.75 | 15.63 | 36.29 |
| 25000 | 4.40 | 39.43 | 21.56 | 44.94 |
| 50000 | 4.70 | 51.92 | 32.51 | 61.26 |
| 75000 | 4.88 | 61.78 | 40.70 | 73.98 |
| 100000 | 5.00 | 70.31 | 47.34 | 84.76 |
| 150000 | 5.18 | 85.06 | 57.74 | 102.81 |
| 250000 | 5.40 | 109.54 | 71.69 | 130.92 |

TABLE 1-continued

Characteristic impedance $Z_0$ as a function of frequency

| FREQ. | LOG FREQ. | $Z_{REAL}$ | $Z_{IMAGINARY}$ | $Z_{MODULUS}$ |
|---|---|---|---|---|
| 500000 | 5.70 | 155.84 | 86.40 | 178.19 |
| 750000 | 5.88 | 188.56 | 87.19 | 207.74 |
| 1000000 | 6.00 | 211.55 | 82.28 | 226.99 |
| 1500000 | 6.18 | 238.94 | 69.58 | 248.59 |
| 2500000 | 6.40 | 260.71 | 47.08 | 264.93 |
| 5000000 | 6.70 | 272.64 | 24.00 | 273.70 |
| 7500000 | 6.88 | 275.04 | 15.40 | 275.47 |
| 10000000 | 7.00 | 275.88 | 11.07 | 276.10 |
| 15000000 | 7.18 | 276.47 | 6.78 | 276.55 |
| 25000000 | 7.40 | 276.75 | 3.48 | 276.78 |

Therefore, for $w \geq w_c$:

$$Z_O = \sqrt{\frac{K\cdot \sqrt{w} + jLw}{G + jCw}}$$

and for $w \leq w_c$ $$Z_O = \sqrt{\frac{K\cdot \sqrt{wc} + jLw}{G + jCw}}$$

For the above parameters and properties, it can be shown that:
$w_c=100$ Hz
$\delta(w_c)=5$ mm
Therefore, on the logarithmic horizontal axis of the graph in FIG. 14, the lower frequency limit is 100 Hz, which is $w_c$ in the above simulation. The upper frequency limit is 25 MHz, which, in some embodiments, is a maximum frequency of a classical generator.

In some embodiments, different optimization refinements may improve accuracy and range of applicability of the inventive technology. For example, the processes of the defect localization and characterization may be de-coupled. As a result, a reflection coefficient that is respectively lower than β and higher than ∝ may be used. However, the decoupling may result in the longer test time. Furthermore, the inventive technology may be adaptable for bigger defects (compared to the "natural" range allowed by $Z_O$ at minimum frequency) because an impedance can be added to the soil electrode. In general, economic considerations may be used to strike the balance between the test team and the repair team regarding the handling of the information workflow.

Determining Location of Defect

Figure 15A:
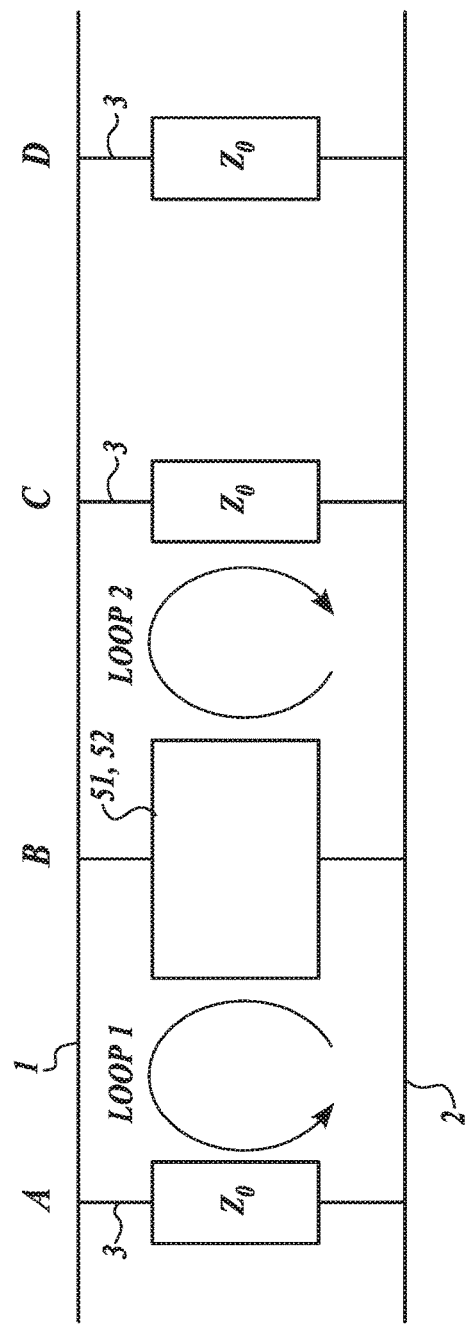
FIGS. 15A and 15B are schematic diagrams of defect detection in accordance with embodiments of the presently disclosed technology.
Figure 15B:
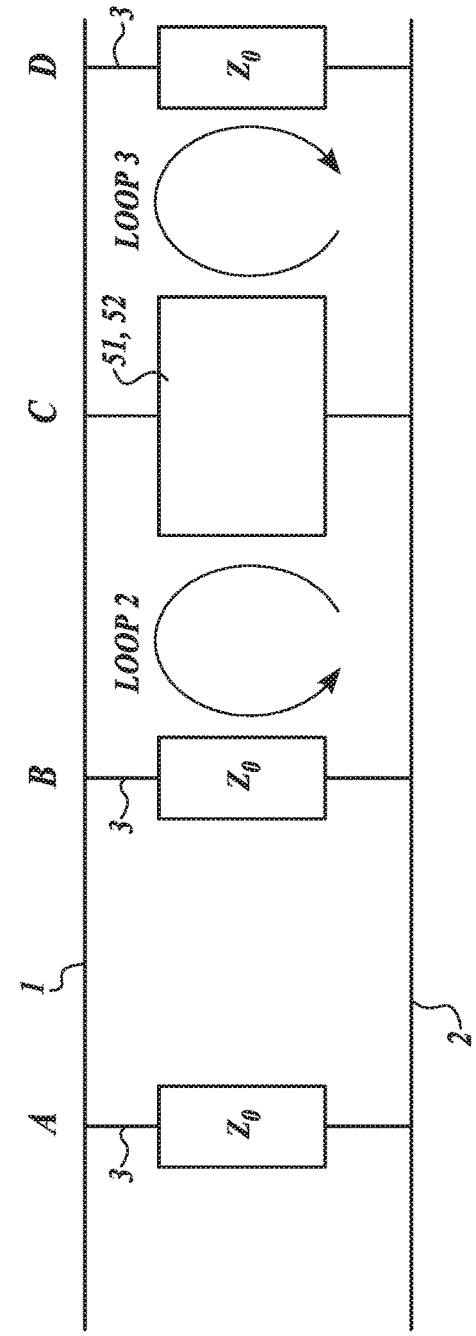

FIGS. 15A and 15B are schematic diagrams of defect detection in accordance with an embodiment of the presently disclosed technology. FIG. 15A shows the signal generator 52 generating signals that propagate along pipeline 1, and return to the data acquisition equipment 51 through Loop 2. However, an equivalent mirror image Loop 1 is also created. This is because the pipelines 1, 2 extend on both sides from the signal generating and acquisition equipment 51, 52. Therefore, in practice, one section of the pipelines 1, 2 is not isolated from another. As a result, in some embodiments, it is not possible to tell on what side of the signal generating and acquisition equipment 51, 52 the defect occurs.

FIG. 15B shows the signal generating and acquisition equipment 51, 52 at the next location. Here, the signals are again generated in two loops: Loop 2 and Loop 3. In some embodiment, the location of the defect can be determined based on multiple measurements that are offset along the pipeline by a predetermined distance. For example, the measurements between points A, B, C may be performed on Loop 1 and Loop 2, and then compares with the measurements between points B, C, D on Loop 2 and Loop 3. Some embodiments of such measurements are discussed in conjunction with FIGS. 16-19 below.

Figure 16:
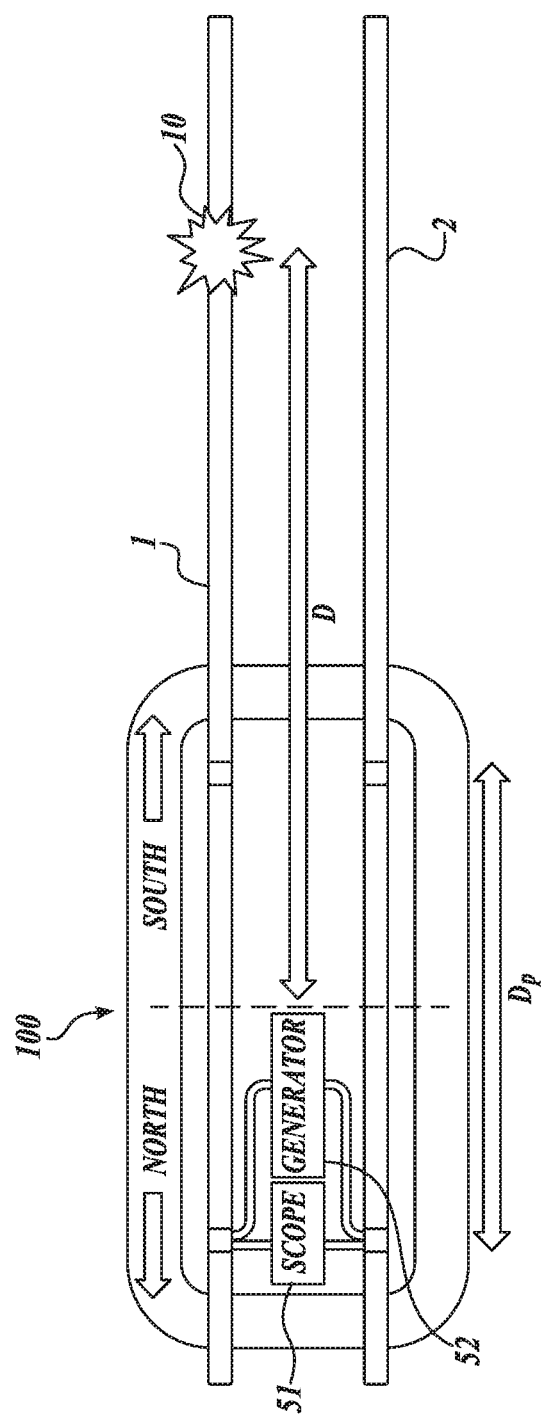
FIGS. 16 and 17 are schematic diagrams of defect detection in accordance with embodiments of the presently disclosed technology.
Figure 17:
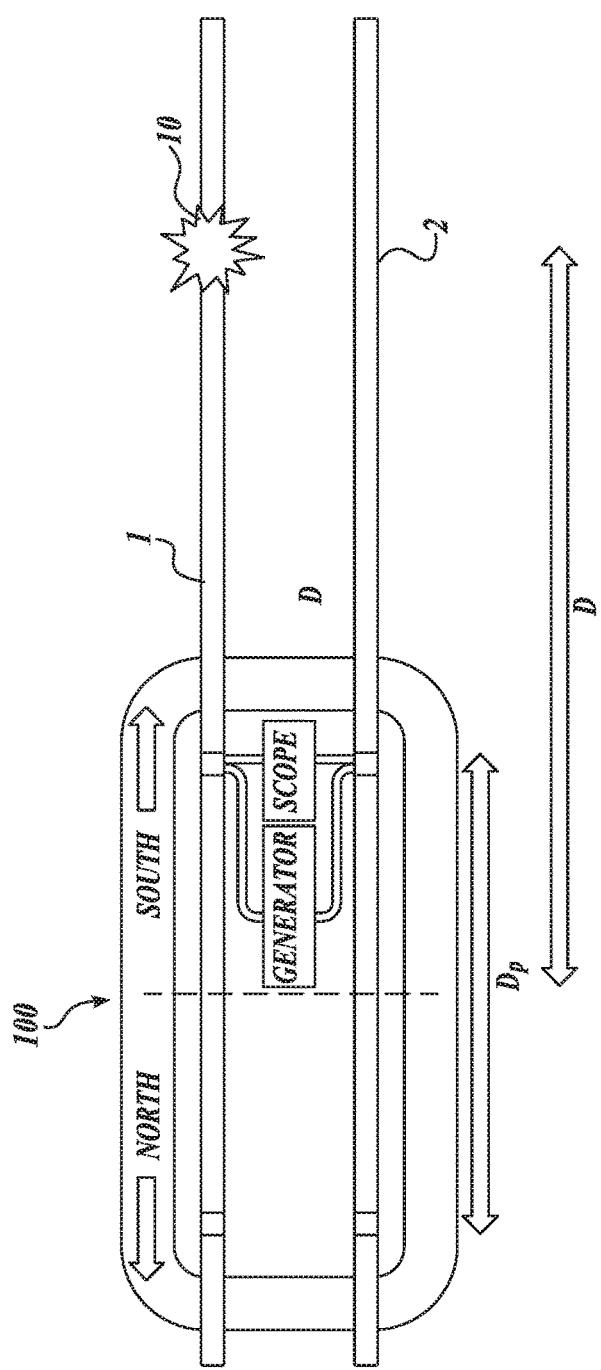

FIGS. 16 and 17 are schematic diagrams of defect detection in accordance with embodiments of the presently disclosed technology. In some embodiments, two sets of measurements are performed at two sides of the manhole 100. FIG. 16 illustrates the measurements performed at the North end, and FIG. 17 illustrates the measurements performed at the South end. In both cases, the defect 10 may cause signal reflection, but the distance Dp between the two points of measurement causes different signal reflection, as explained below with reference to FIGS. 18-20.

Figure 18:
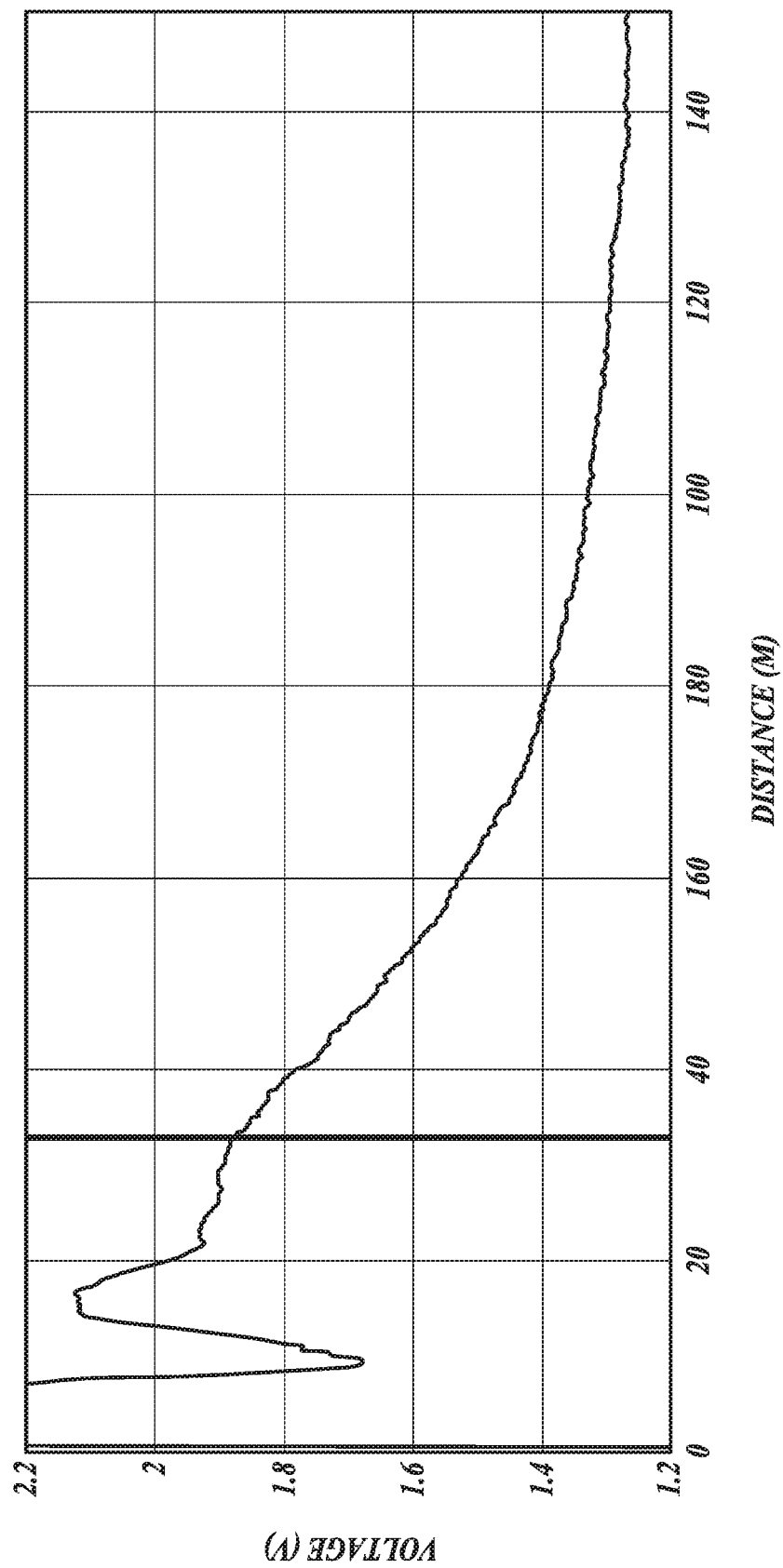
FIGS. 18-20 are graphs of defect detection in accordance with embodiments of the presently disclosed technology.
Figure 19:
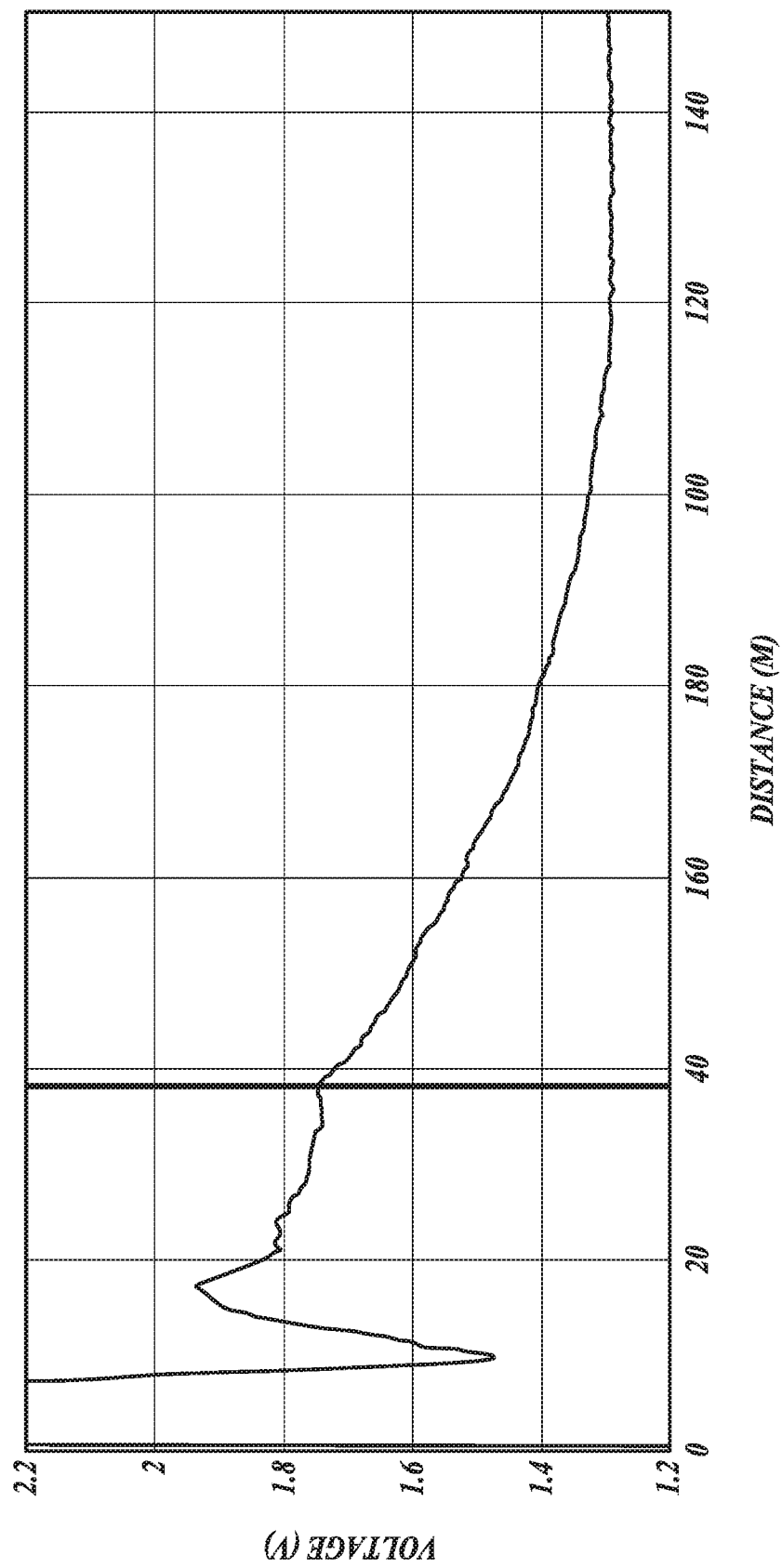

FIGS. 18 and 19 are graphs of defect detection in accordance with embodiments of the presently disclosed technology. The horizontal axes in the graphs represent a distance in meters from the source of signals along the pipeline. The vertical axes represent signal intensity in Volts. The vertical line in the graphs corresponds to the location of the defect in the pipeline.

The graph in FIG. 18 corresponds to the measurements performed from the south end of the manhole (FIG. 17), and the graph in FIG. 19 corresponds to the measurements performed from the north end of the manhole (FIG. 16). The graphs can be analyzed to indicate the distance of the defect from the probing point specific to that setup. For example, when FIGS. 18 and 19 are analyzed for the indication of defects, the location of the defect in FIG. 18 is about 33 meters, and the location of the defect in FIG. 19 is about 38 meters, because a length Dp of the manhole 100 is 5 meters. This means that the defect 10 is 35.5 away from the center of the manhole 100.

Furthermore, a comparison of the profiles in FIGS. 18 and 19 also helps to determine the side of the defect, that is, the imaginary mirror image defect may be eliminated. For example, since the defect 10 is closer to the South end of the manhole 100, and is more distant from the North end of the manhole, the real (non-imaginary) defect 10 is on the south side of the manhole 100.

Figure 20:
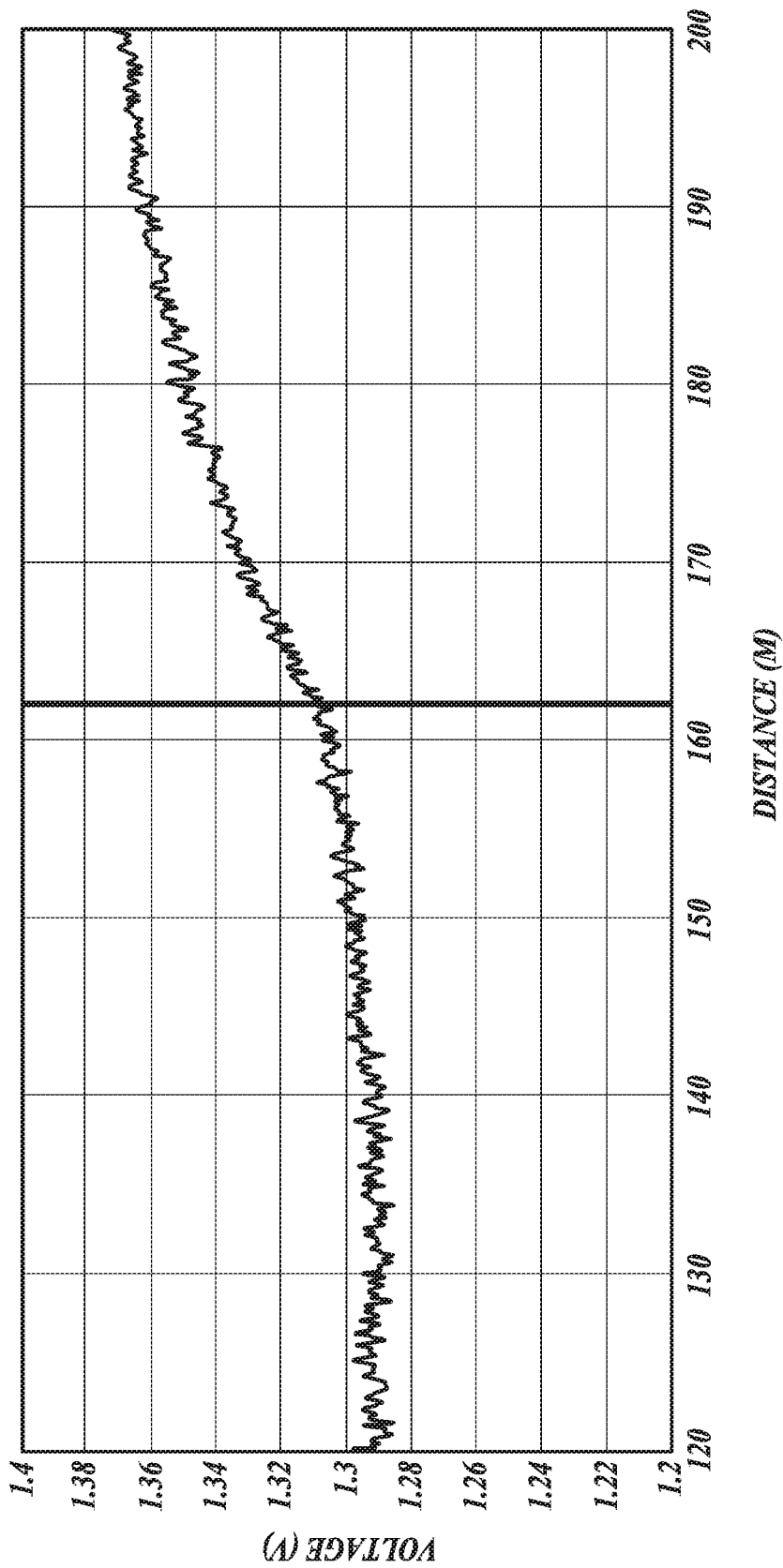

FIG. 20 is a graph of defect detection in accordance with embodiments of the presently disclosed technology. The horizontal axis represents a distance from the point of measurement (i.e., a manhole that houses the electronic equipment), and the vertical axis represents the intensity of signal. The illustrated reflectometry profile provides information about the medium through which the signal is propagating. Specifically, the positive reflections signify a decrease in the medium dielectric permittivity, such as a transition from soil to concrete and air. These reflections may indicate how the adjacent manhole is seen from the probing point of another manhole.

In some embodiments, the change in signal intensity may be useful to check signal velocity estimates or to calibrate the velocity. For example, the reflectometry signature of a manhole (without shunt cable 3 connecting the pipelines) can be seen from the probing point of an adjacent manhole. In the illustrated example, the two manholes were 174 m apart. Given that those manholes were 6 m wide, the expected distance at which the reflection due to the soil/concrete/air boundary is seen is 168 m. This can be compared with the measured distance of 164 m in the graph of FIG. 20. Therefore the signal velocity used is accurate within about 4 meters over that section of pipeline, resulting in an error of less than 4%.

Defects Located Between Pipeline and Concrete Wall

Figure 21:
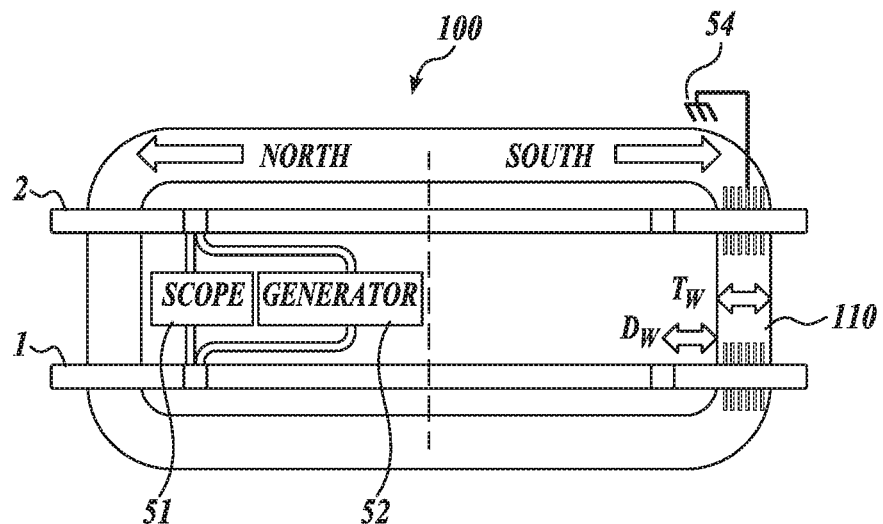
FIGS. 21 and 22 are schematic diagrams of defect detection in accordance with embodiments of the presently disclosed technology.
Figure 22:
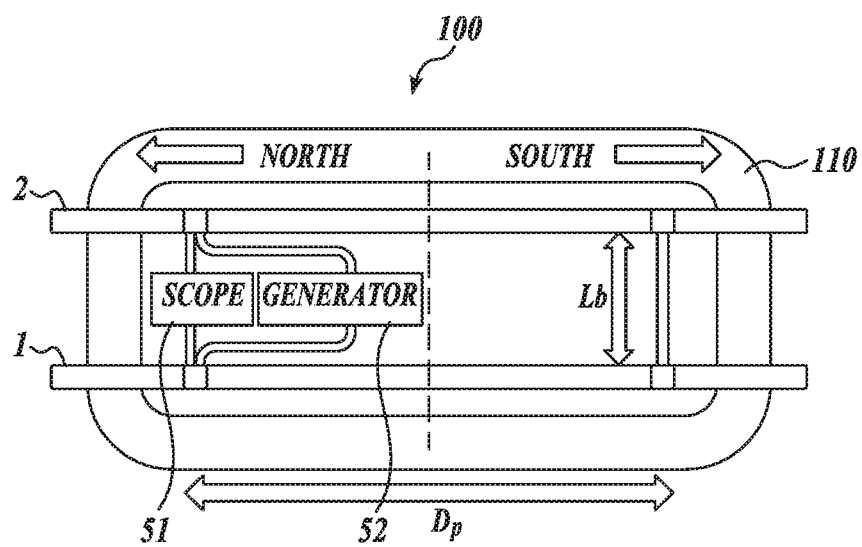

FIGS. 21 and 22 are schematic diagrams of defect detection in accordance with embodiments of the presently disclosed technology. In some embodiments, the integrity of insulation of the pipelines against a wall 110 may be evaluated using the setups illustrated in FIGS. 21 and 22. In some embodiments, the wall 110 is a concrete wall. In some embodiments, FIG. 21 corresponds to an un-calibrated setup, and FIG. 22 corresponds to a calibrated setup. The calibrated setup includes the shunt cable 3 having known impedance. Thickness Tw represents a thickness of the concrete wall of the manhole, and distance Dw represents a distance from the concrete wall 110 to the location of the shunt cable 3.

When the end wall of the manhole 100 includes a faulty isolation, (e.g., there is electrical path from the pipeline to the ground through the end wall 110), then a signal reflection occurs at the interface between the pipe and the wall because of the localized change in impedance. Therefore, signal reflectometry can be used for an assessment of the pipeline coating and/or insulation within the endwall. In some embodiments, these reflectometry profiles may be obtained in an uncalibrated setup (also referred to as the "raw setup") and a calibrated setup. Different reflectometry profiles are described with reference to FIGS. 23 and 24 below.

Figure 23:
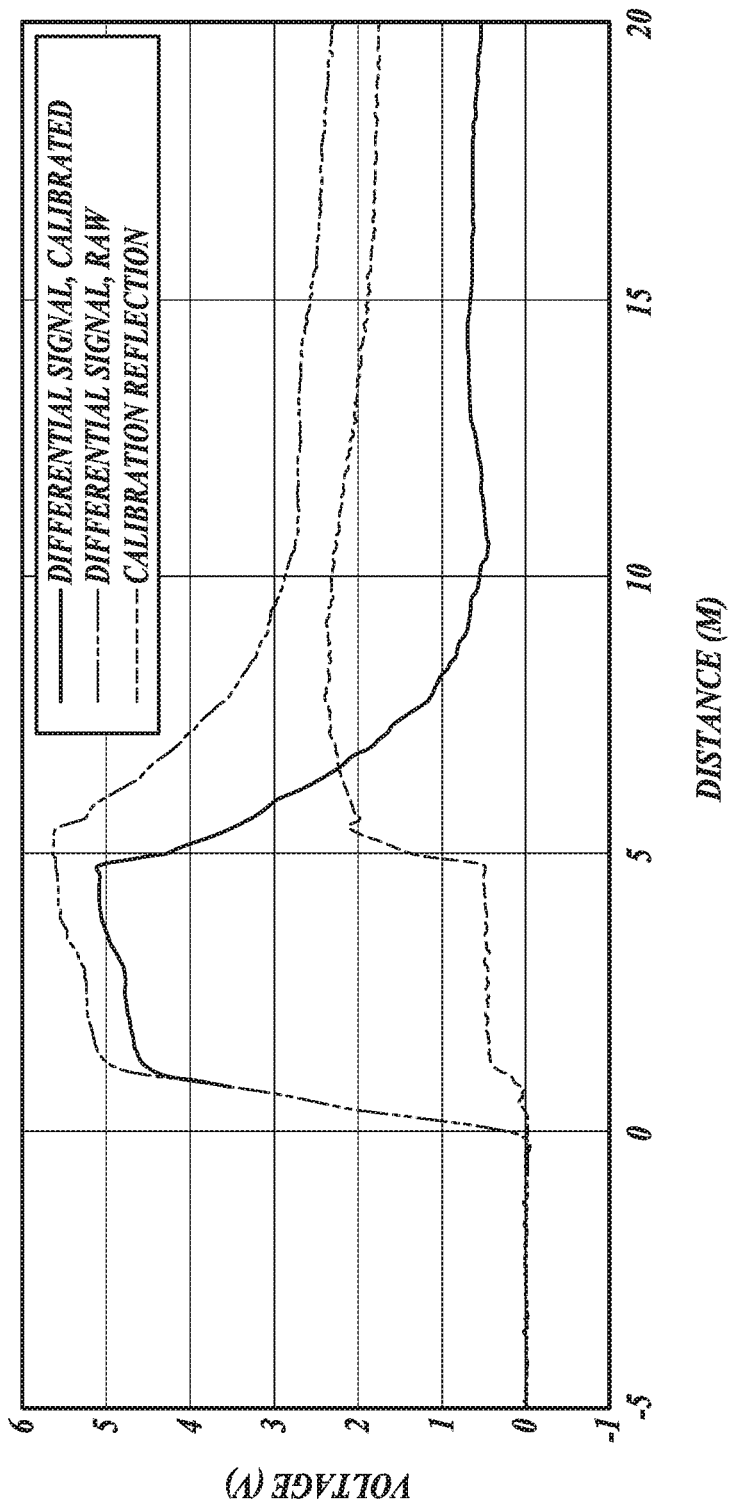
FIGS. 23 and 24 are graphs of defect detection in accordance with embodiments of the presently disclosed technology.
Figure 24:
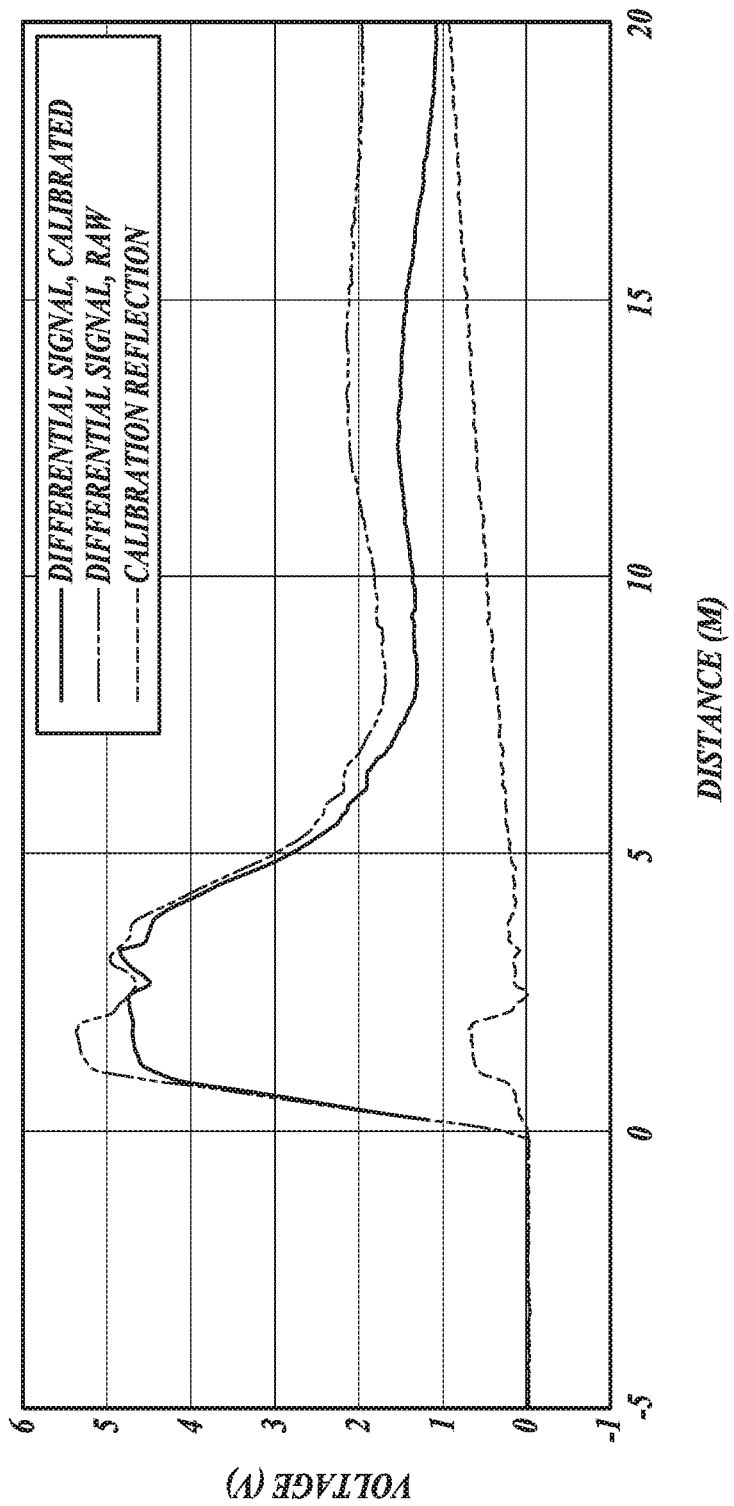

FIGS. 23 and 24 are graphs of defect detection in accordance with embodiments of the presently disclosed technology. FIG. 23 corresponds to undamaged insulation between the pipelines and the walls of the manhole. FIG. 24 corresponds to damaged (compromised) insulation between the pipelines and the walls of the manhole. For both graphs, the horizontal axes correspond to the distance from the source of the signal, and the vertical axes correspond to the intensity of signals in Volts.

With the undamaged insulation of FIG. 23, almost no current is lost when the signal propagates through an endwall 110 (e.g., a concrete wall) of the manhole 100. As a result, the boundary between the concrete of the manhole and the surrounding soil induces a sharp reflection the un-calibrated setup. The sharp reflection corresponds to the distance of about 5.5 m.

With the undamaged insulation of FIG. 23, when the shunt 3 is present in the calibrated setup, the shunt 3 also induces a sharp reflection, but closer to the source of the signal than in the case of the uncalibrated setup. The apparent distance between those reflections in FIG. 23 depends on (Lb−Tw−Dw). In some embodiments, the difference between those two profiles of the curve labeled "calibration reflection" is sharp, and may indicate relatively precisely the place where the shunt was introduced. Furthermore, the difference between the two "calibration reflection" profiles also indicates the compromised (damaged) insulation in FIG. 24. For example, in the case of a compromised insulation, the impact of the presence or absence of the shunt is reduced, because of the signal leakage through the concrete wall. As a result, the calibration reflection appears blunted in the graph of FIG. 24. In some embodiments, an assessment of the coating insulation within different materials, including concrete, may be performed based on the shape of the calibration reflection curves like those in FIG. 24, and the comparison of those curves with reference curves of undamaged insulation like those in FIG. 23.

Many embodiments of the technology described above may take the form of computer-executable or controller-executable instructions, including routines stored on non-transitory memory and executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. In many embodiments, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. A method for detecting defects in pipelines, comprising:
    generating an electrical signal in a first pipeline and a second pipeline by a signal generator that is electrically connected by at least one cable with the first pipeline by one end of the at least one cable and with the second pipeline by another end of the at least one cable, wherein the first pipeline and the second pipeline are offset from each other such that the first pipeline and the second pipeline have separate and different center axes;
    acquiring a reflected signal by a data acquisition equipment electrically connected with the first pipeline and the second pipeline, wherein the reflected signal at least partially reflects from a detect in the first pipeline or the second pipeline; and
    analyzing the reflected signal to determine at least one of a location of the defect and a severity of the defect.

2. The method of claim 1, wherein the first pipeline and the second pipeline are connected with a shunt cable.

3. The method of claim 1, wherein the electrical signal is a differential electrical signal, and wherein the signal generator generates a high signal in the first pipeline and a low signal in the second pipeline.

4. The method of claim 1, further comprising adjusting a frequency of the electrical signal such that a skin depth ($\delta$) for the electrical signal corresponds to a wall thickness (e) of the pipeline.

5. The method of claim 1, further comprising adjusting a frequency of the electrical signal such that an impedance of the defect (ZD) is an order of magnitude larger than an impedance of the first pipeline and the second pipeline (Z0).

6. The method of claim 1, further comprising adjusting a frequency of the electrical signal such that a reflection coefficient ($\Gamma$) for the signal is bounded by:

$$\beta_\Gamma \leq \Gamma \leq \alpha_\Gamma$$

wherein $\beta_\Gamma$ is a lower bound ratio and $\alpha_\Gamma$ is an upper bound ratio.

7. The method of claim 1, wherein the electrical signal is a first electrical signal that is generated at a first end of a manhole, and the reflected signal is a first reflected signal that is acquired at the first end of the manhole, the method further comprising:
    generating a second electrical signal in the first pipeline by the signal generator electrically connected with the first pipeline at a second end of the manhole, wherein the second end of the manhole is opposite from the first end of the manhole in a longitudinal direction along the first pipeline;
    acquiring a second reflected signal by the data acquisition equipment electrically connected with the first pipeline at the second end of the manhole, wherein the second reflected signal at least partially reflects from the defect; and
    analyzing the first reflected signal and the second reflected signal to determine at least one of the location of the defect and the severity of the defect.

8. The method of claim 7, wherein the first pipeline includes the defect that is in contact with a wall of the manhole, and wherein the location of the defect is determined based on a return-trip delay between generating the electrical signal and receiving the reflected signal.

9. The method of claim 1, wherein the location of the defect is determined based on a return-trip delay between generating the electrical signal and receiving the reflected signal, and wherein the severity of the defect corresponds to an amplitude of the reflected signal.

10. A method for detecting defects in pipelines, comprising:
    generating a first electrical signal in a first pipeline by a signal generator that is electrically connected by at least one cable with the first pipeline and a second pipeline, wherein the first pipeline is connected with one end of the at least one cable and wherein the second pipeline is connected with another end of the at least one cable, wherein the first pipeline and the second pipeline are electrically connected through a corrosive-electrolyte environment, wherein the first pipeline has a first center axis and the second pipeline has a second center axis that is separate from the first center axis;
    acquiring a first reflected signal by a data acquisition equipment electrically connected with the first pipeline and the second pipeline, wherein the reflected signal at least partially reflects from a defect in the first pipeline or the second pipeline;
    generating a second electrical signal in the second pipeline by the signal generator;
    acquiring a second reflected signal by the data acquisition equipment, wherein the reflected signal at least partially reflects from the defect; and
    analyzing the first reflected signal and the second reflected signal to determine at least one of a location of the defect and a severity of the defect.

11. A system for detecting defects in pipelines, comprising:
    a signal generator that is electrically connected by at least one cable with a first pipeline and a second pipeline, wherein the first pipeline is connected with one end of the at least one cable and wherein the second pipeline is connected with another end of the at least one cable, wherein the signal generator is configured to generate a differential signal in the first pipeline and the second pipeline, wherein the first pipeline has a first center axis and the second pipeline has a second center axis that is separate from the first center axis; and a data acquisition equipment electrically connected with the first pipeline and the second pipeline, wherein the data acquisition equipment is configured to receive a reflected signal at the first pipeline, and wherein the reflected signal is reflected at least partially off a defect in the first pipeline or the second pipeline.

12. The system of claim 11, and wherein the first pipeline and the second pipeline are connected with a shunt cable.

13. The system of claim 12, wherein the shunt cable has adjustable impedance.

14. The system of claim 11, wherein the first pipeline and the second pipeline are at least partially inside a manhole.

15. The system of claim 11, wherein the data acquisition equipment is selected from a group consisting of an oscilloscope, an analog-to-digital (A/D) converter, and a spectrum analyzer.

16. The system of claim 11, wherein a skin depth ($\delta$) of the electrical signal corresponds to a wall thickness (e) of the pipeline.

17. The system of claim 11, wherein an impedance of the defect (ZD) is an order of magnitude larger than an impedance of the first pipeline and the second pipeline (Z0).

18. The system of claim 11, wherein a reflection coefficient ($\Gamma$) of the signal is bounded by:

$$\beta_\Gamma \leq \Gamma \leq \alpha_\Gamma$$

wherein $\beta_\Gamma$ is a lower bound ratio and $\alpha_\Gamma$ is an upper bound ratio.

19. The system of claim 11, wherein the defect is in contact with a wall of a manhole, and wherein the defect is one of a detachment, a delamination, or a corrosion area.

* * * * *

UNITED STATES PATENT AND TRADEMARK OFFICE
CERTIFICATE OF CORRECTION

Page 1 of 1

PATENT NO. : 11,340,185 B2
APPLICATION NO. : 16/499184
DATED : May 24, 2022
INVENTOR(S) : H. Castaneda-Lopez et al.

It is certified that error appears in the above-identified patent and that said Letters Patent is hereby corrected as shown below:

In the Claims

| Column | Line | |
|--------|------|--|
| 15 | 43 | change "a detect" to -- a defect -- |

Signed and Sealed this
Sixteenth Day of May, 2023

Katherine Kelly Vidal
*Director of the United States Patent and Trademark Office*